Sept. 20, 1949. C. E. MELHORN 2,482,427
GROUP ARRANGING CONVEYER MECHANISM
Filed May 3, 1947 3 Sheets-Sheet 1
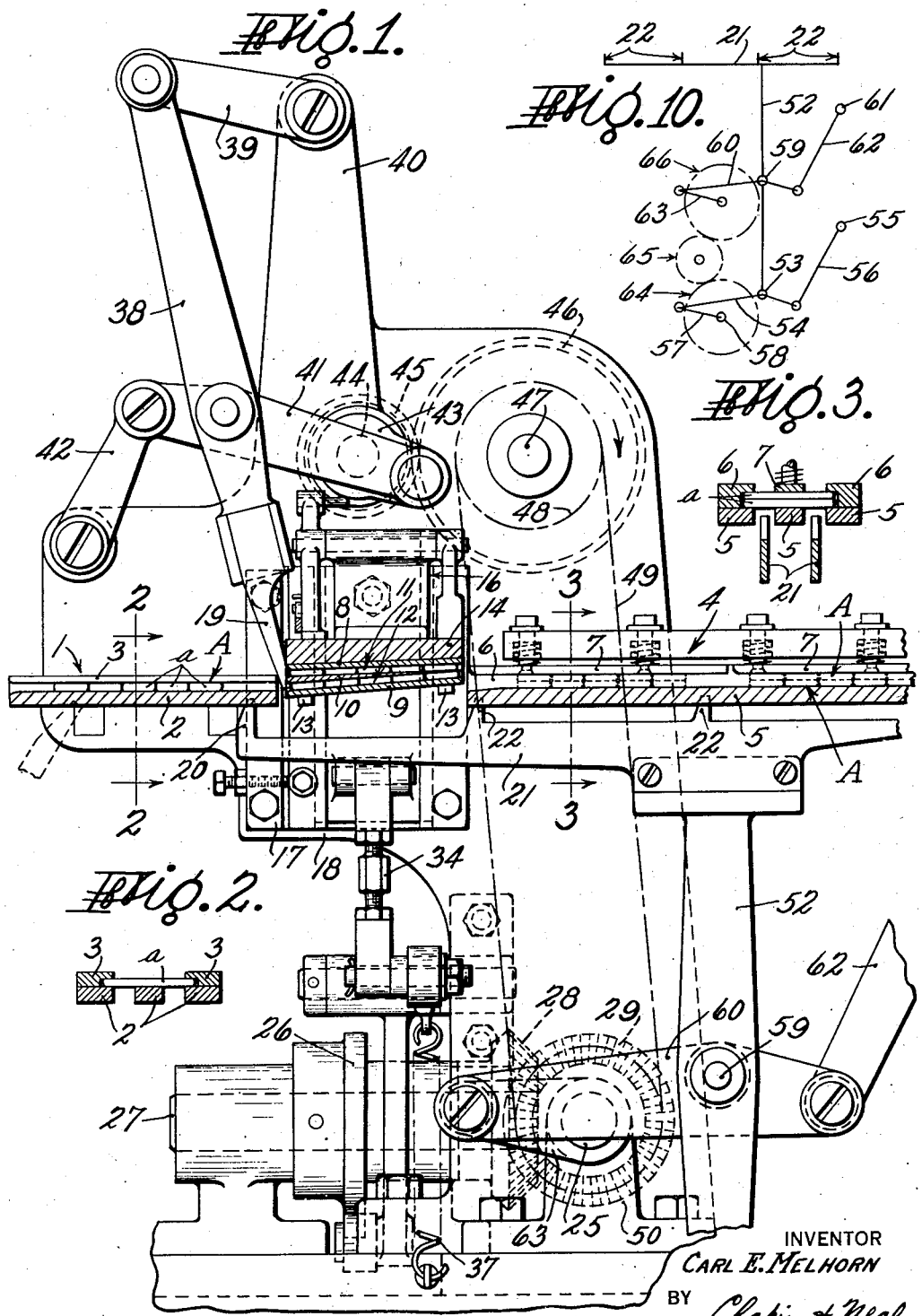
INVENTOR
CARL E. MELHORN
BY
Chapin + Neal
ATTORNEYS

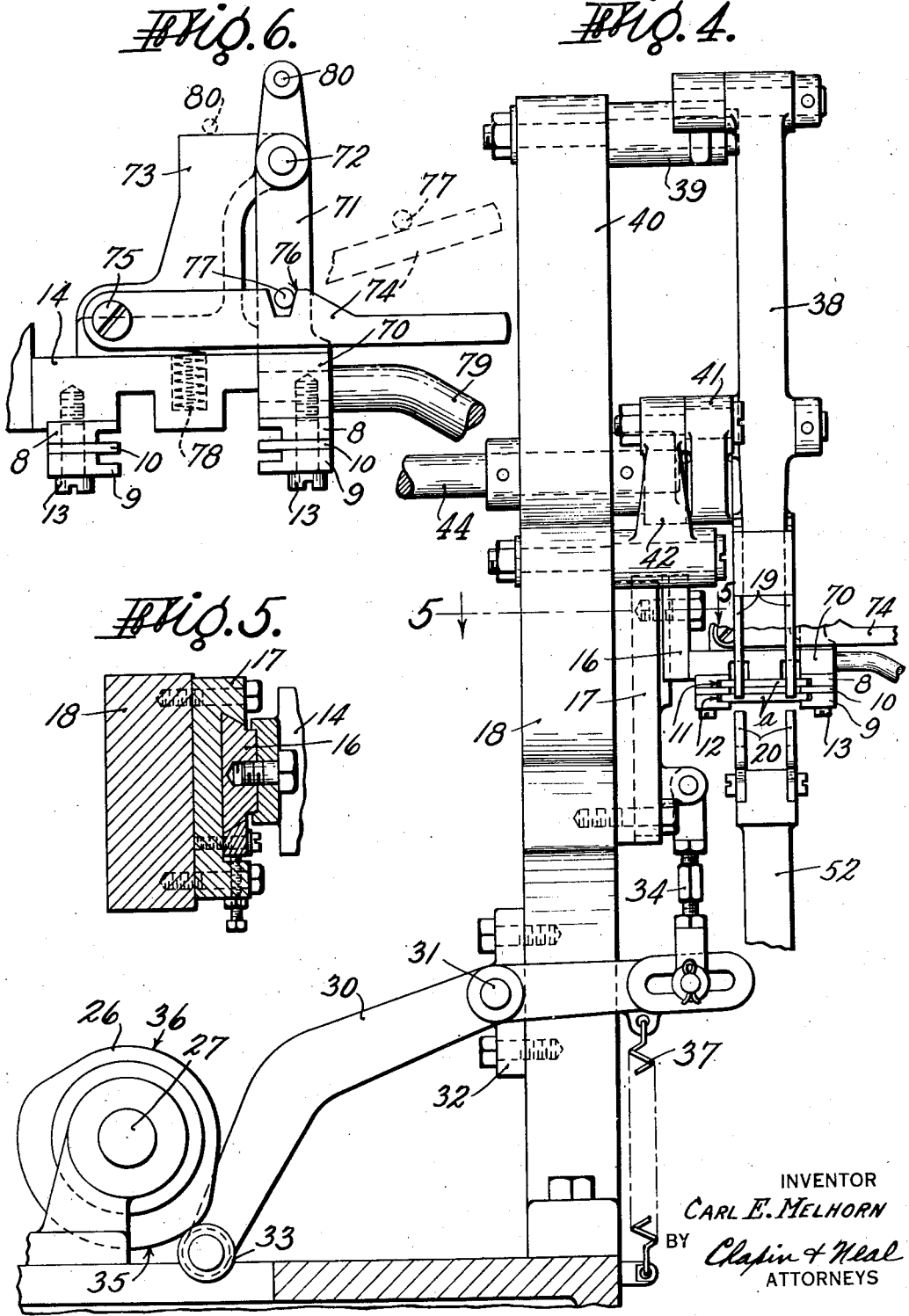

Sept. 20, 1949.                C. E. MELHORN                 2,482,427
                       GROUP ARRANGING CONVEYER MECHANISM
Filed May 3, 1947                                        3 Sheets-Sheet 3
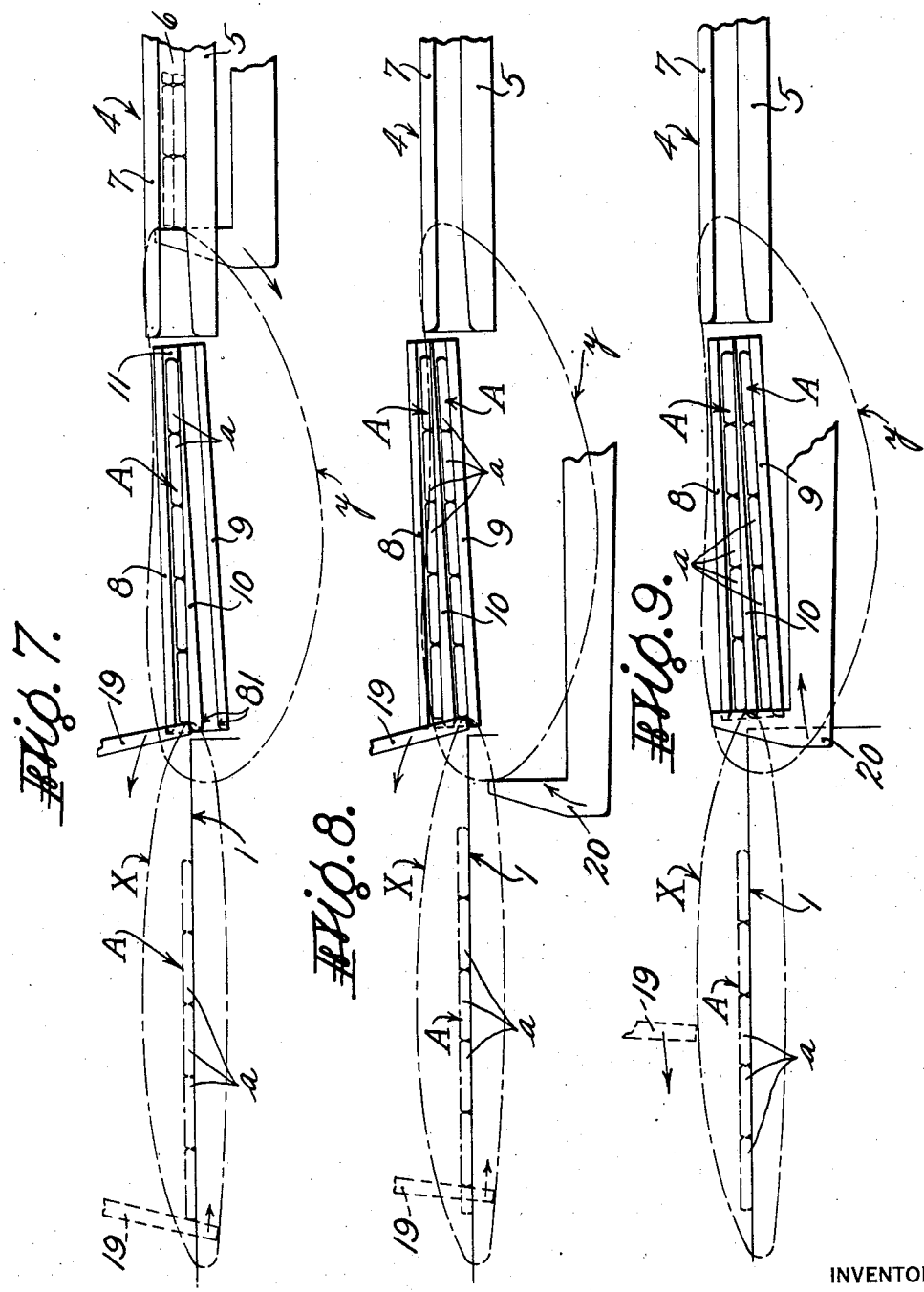
INVENTOR
CARL E. MELHORN
BY Clapin & Neal
ATTORNEYS Patented Sept. 20, 1949

2,482,427

UNITED STATES PATENT OFFICE 2,482,427

GROUP ARRANGING CONVEYER MECHANISM

Carl E. Melhorn, Springfield, Mass., assignor to Package Machinery Company, East Longmeadow, Mass., a corporation of Massachusetts Application May 3, 1947, Serial No. 745,849

4 Claims. (Cl. 198—31)

This invention relates to an improvement in devices for forming gum packages and more particularly to a device for assembling a plurality of small wrapped articles such as gum sticks or the like in a plurality of superposed groups preparatory to enclosing the group in a common wrapper or label.

The principal object of the invention is to provide a device of the above character which will operate at a relatively high speed upon relatively small thin articles without damaging the articles, or misplacing or tearing the wrappers in which each is individually enclosed.

Other and further objects residing in the details of construction will be made apparent in the following specification and claims.

In the accompanying drawings which disclose one embodiment of the invention,

Fig. 1 is a side elevational view, parts being broken away;

Fig. 2 is a section substantially on line 2—2 of Fig. 1;

Fig. 3 is a section substantially on line 3—3 of Fig. 1;

Fig. 4 is an end elevational view of the structure shown in Fig. 1, looking from the left in the latter figure;

Fig. 5 is a section substantially on line 5—5 of Fig. 4;

Fig. 6 is a detailed end view, on a larger scale, of the elevator;

Figs. 7, 8 and 9 are diagrammatic views showing successive steps in the operation of the device; and Fig. 10 is a diagrammatic view showing the driving connections of the discharge member.

Referring to the drawings the device is shown as including a supply channel, generally indicated at 1, which comprises a split platform 2 and spaced side and upper guide members 3. Groups A, consisting of a plurality of individually wrapped gum sticks a are fed into the channel 1 by any suitable means, not shown. Spaced from channel 1 is a delivery channel 4 made up of a split delivery platform 5, side guide members 6, and spring pressed center plates 7.

Positioned between the supply and delivery channel is an elevator device which comprises spaced pairs of upper and lower guide members 8 and 9 respectively and intermediate guide members 10 (Fig. 4) which form upper and lower assembly channels 11 and 12. The members 8, 9 and 10 are fastened by machine screws 13 to a cantilever arm 14 secured to a member 16, mounted for vertical reciprocation in guide way 17 secured to frame 18, and reciprocated in its guides by means later described.

Groups of gum sticks are periodically moved from the supply platform 2 into the assembly channels 11 and 12 by a transfer member 19 and the contents of both assembly channels are subsequently simultaneously discharged onto the delivery platform 5 by a discharge member 20. During the loading and discharging operations of the transfer and discharge member the elevator is moved from its lowermost position, shown in Fig. 7 to its uppermost position shown in Fig. 8 and back to its lower position as shown in Fig. 9.

When the parts are in the position shown in Fig. 7 the upper assembly channel 11 is in alignment with the supply channel 1. While the elevator dwells in this position the transfer member 19 moves from the dotted line position in Fig. 7, in which it has engaged the trailing edge of the rear gum stick of a group A on the supply platform, to the full line position in that figure, to slide the engaged group of gum sticks into the upper assembly channel of the elevator. As the transfer member 19 leaves its forward full line position in Fig. 7 to return to its rearward position the elevator starts its movement upwardly to the position of Fig. 8, reaching the latter position shortly after the transfer member commences its second forward movement to deliver a group of gum sticks into the lower assembly channel. The elevator dwells in this upper position until the transfer device completes its forward movement to slide the second group of gum sticks into the lower assembly channel as shown in full lines in Fig. 8. As the transfer member 19 completes the loading of the lower assembly channel the discharge member 20 has moved beneath the assembly channel approximately to the position shown in Fig. 8. As the transfer member 19 recedes the elevator moves downwardly to the position shown in Fig. 9.

During the downward movement of the elevator, transfer member 19 moves rearwardly and as, or shortly after, the elevator reaches the position of Fig. 9 the transfer member 19 reaches the dotted line position in that figure and discharge member 20 engages the trailing edge of the group of articles in each channel as shown in full lines. Member 20 commences its advance while member 19 completes its return movement, but since member 19 moves substantially twice as fast as member 20 member 20 completes the discharge of the gum groups from both assembly channels into the delivery channel, at the same time that member 19 completes the movement of a gum group into the upper assembly channel as shown in Fig. 7. It will thus be seen that the loading and unloading cycles over-lap, the discharge of the superposed group of articles from the elevator taking place substantially simultaneously with the loading of the upper channel. Member 20 is carried by bars 21 which also carry additional members 22 which advance the superposed groups of sticks along the discharge channel to the wrapping instrumentalities of a wrapping machine, not shown.

The elevator, transfer member and discharge member are all driven from a main drive shaft 25.

The elevator is reciprocated in its guide by a cam 26 secured on a shaft 27, carrying a bevel gear 28 (Fig. 1) which meshes with a bevel gear 29 secured to main drive shaft 25. A lever 30 pivoted at 31 to a bracket 32, carries a cam roll 33 at one end which engages cam 26. The other end of lever 30 is connected by an adjustable link 34 to member 16 of the elevator. The cam 26 is formed with a high portion 35 and a low portion 36. When roll 33 rides onto the high portion 35, the elevator, as will be apparent from Fig. 4, is moved to its upper position and is held there while the portion 35 completes its travel beneath roll 33. The roll 33 is maintained in contact with the cam by a spring 37. As cam roll 33 follows the low cam portion 36 the elevator moves downward to and dwells in lowered position.

The transfer member 19 is carried at the lower end of a lever 38 (Fig. 1), pivotally connected at its upper end to a link 39 which in turn is pivotally connected to a frame member 40. Adjacent member 19 the lever 38 is also pivotally connected to a link 41 one end of which is connected by a link 42 to frame member 40, the other end of link 41 being connected to a crank 43. Crank 43 is fixed to a shaft 44, journaled in frame 40, and carries a gear 45 meshing with a gear 46 secured on a shaft 47. Shaft 47 also carries a sprocket 48 driven by sprocket chain 49 from a sprocket 50 secured on main shaft 25. By means of the drive and linkage just described the transfer member 19 is caused to travel in the closed path indicated in broken lines at x in Figs. 7 to 9.

The bar 21 which carries the discharge member 20, and members 22, is driven by means best shown in Figs. 1 and 10. The bar 21 is secured to the upper end of a lever 52, the lower end of which is pivotally connected at 53 to a lever 54, one end of which is linked to a fixed pivot 55 by a link 56. The other end of lever 54 is connected to a crank 57 secured to a shaft 58. Intermediate its ends lever 52 is pivoted at 59 to a lever 60, one end of which is linked to a fixed pivot 61 by a link 62. The other end of lever 60 is connected to a crank 63 secured to the main drive shaft 25. Shaft 58 is driven from the main drive shaft through a gear 64 secured to shaft 58 which meshes with an intermediate gear 65 meshing with a gear 66 on the main drive shaft. By the parallel linkage and gearing just described member 20 is caused to travel in the enclosed path indicated at y in broken lines.

Preferably, and as best shown in Fig. 6, the outer member of each pair of members 8, 9 and 10, is connected to the cantilever support 14 in a manner to be swung outwardly to give access to the assembly channels in the elevator. For this purpose the portion 70 of the support to which the outer members 8, 9 and 10 are secured is carried by an arm 71 pivoted at 72 to a bracket 73 carried by the body of the support. Portion 70 is normally held in closed position by a catch member 74 pivoted to the bracket 73 at 75. Member 74 is formed with a notch 76 which is pressed into locking engagement with a pin 77 on arm 71 by a spring 78. By pressing catch 74 downwardly against the action of spring 78 the pin 77 may be released from notch 76 permitting the arm 71 and the parts carried thereby to be swung outwardly as shown in dotted lines in Fig. 6. A handle 79 extending from portion 70 facilitates opening the channels and the extent of opening movement is limited by the engagement of a pin 80 carried by arm 71, with bracket 73.

One of the objects of the present invention is to provide for the safe handling of thin gum sticks with a minimum of danger of damaging the sticks, or misplacing or tearing the individual wrappings of the sticks. The entrance edges of guide members 8, 9 and 10 are made relatively thick and rounded as indicated at 81 so that the wrapped gum sticks may be introduced into the assembly channels with a minimum of danger and in the absence of sharp edges. It is desirable that the two superposed groups leave the elevator in as close proximity as possible to minimize the possibility of their disarrangement. The intermediate guide members 10 are therefore progressively reduced in thickness toward the discharge end of the channels, the height of the channels themselves being maintained uniform throughout their length.

I claim:

1. A device of the character described which comprises a supply channel, a discharge channel spaced from the supply channel, a vertically movable elevator mechanism positioned between the supply and discharge channels, upper and lower article assembly channels formed in the elevator, each assembly channel including a pair of transversely spaced supporting members extending from one end of the elevator to the other, a transfer mechanism, including a member engageable with the trailing edge of a group of wrapped articles positioned in the supply channel when the elevator is in lowered position with the entrance to the upper assembly channel registering with the supply channel and the exits of both assembly channels registering with the discharge channel, cam means advancing said transfer member to move the engaged group into said upper assembly channel and return said transfer member in a closed path to group engaging position, means to raise the elevator during the return movement of the transfer member and position the entrance of the lower assembly channel at the level of the supply channel to receive a group of articles on the next forward movement of the tansfer member, means to lower the elevator to its initial position, a discharge member engaging the trailing edges of the groups of articles in both the upper and lower assembly channels and means to advance said discharge member to move the groups of articles in the assembly channels into superposed relation in the discharge channel substantially simultaneously with the advance of a group of articles into the upper assembly channel by the forward movement of the transfer member.

2. A device of the character described which comprises a supply channel, a discharge channel, a vertically movable elevator mechanism positioned between the supply and discharge channels, upper and lower article assembly channels formed in the elevator, each assembly channel including a pair of transversely spaced supporting members, a transfer mechanism including a member engageable with the trailing edge of a group of articles positioned in the supply channel, means to move said transfer member in a closed path between said point of article engagement and the entrance to the elevator assembly channels, means to reciprocate said elevator between a position, in which the entrance to the upper assembly channel is in register with the supply channel and the exits from both assembly channels are in register with the discharge channel, and a position in which the entrance to the lower assembly channel is in register with the supply channel, a discharge member engageable with the trailing edge of an article group in each elevator channel when the elevator is in its lower position and movable from said point of article engagement forwardly between said spaced supporting members to a point forwardly of the elevator, and means to move said discharge member in a closed path between said points at an overall speed approximately half that of the transfer member, the termination of the first loading advance of the transfer member substantially coinciding with the termination of the discharging advance of the discharge member.

3. A device of the character described which comprises a supply channel, a discharge channel, a vertically movable elevator mechanism positioned between the supply and discharge channels, said elevator comprising a cantilever support, transversely spaced pairs of upper, intermediate and lower guide members carried by said support and forming two superposed article assembly channels, the edges of said guide members at the entrance to said channels being relatively thick and rounded, said intermediate members decreasing in thickness from the entrance to the exit of the channels, means to reciprocate said cantilever support between a lower position, in which the entrance to the upper assembly channel is in register with the supply channel and the exits of both assembly channels are in register with the discharge channel, and an upper position in which the entrance to the lower assembly channel is in register with the supply channel, means operating through the space between said pairs of guide members to discharge articles from both assembly channels in superposed relation into the discharge channel when the elevator is in said lower position, and transfer means to feed articles from the supply channel into the upper assembly channel as articles in said upper channel are discharged therefrom, and to feed articles into said lower channel when the elevator is in said upper position.

4. A device of the character described which comprises a supply channel, a discharge channel, a vertically movable elevator mechanism positioned between the supply and discharge channels, said elevator comprising a cantilever support, transversely spaced pairs of upper, intermediate and lower guide members carried by said support and forming two superposed article assembly channels, one of each pair of said guide members being pivotally connected to said support to swing outwardly from the other members of the pair, the edges of said guide members at the entrance to said assembly channels being relatively thick and rounded, said intermediate members decreasing in thickness from the entrance to the exit of the assembly channels, means to reciprocate said cantilever support between a lower position, in which the entrance to the upper assembly channel is in register with the forward end of the supply channel and the exits of both assembly channels are in register with the rear end of the discharge channel, and an upper position in which the entrance to the lower assembly channel is in register with the supply channel, means operating through the space between the pairs of guide members to discharge articles from both channels in superposed relation into the discharge channel when the elevator is in said lower position, and transfer means to feed articles from the supply channel into the upper assembly channel as articles in said upper channel are discharged therefrom, and to feed articles into said lower channel when the elevator is in said upper position.

CARL E. MELHORN.

REFERENCES CITED

The following references are of record in the file of this patent:

UNITED STATES PATENTS

| Number | Name | Date |
|---|---|---|
| 1,648,252 | Aldrich et al. | Nov. 8, 1927 |
| 1,881,844 | Morris | Oct. 11, 1932 |
| 2,020,552 | Hills | Nov. 12, 1935 |
| 2,281,006 | Nicodemus | Apr. 28, 1942 |